United States Patent Office 3,558,336
Patented Jan. 26, 1971

3,558,336
VISCOSE ADDITIVES
Byron N. Baer, Newark, Del., assignor to Atlas Chemical Industries, Inc., Wilmington, Del., a corporation of Delaware
No Drawing. Original application Sept. 1, 1965, Ser. No. 488,816. Divided and this application July 25, 1969, Ser. No. 845,095
Int. Cl. C08b 21/20
U.S. Cl. 106—165
14 Claims

ABSTRACT OF THE DISCLOSURE

A viscose composition and a method of regenerating cellulosic structures from same is disclosed. Said composition containing from about 0.5 to about 6 weight percent, based on cellulose content of the viscose, of a compound characterized by the generalized chemical formula

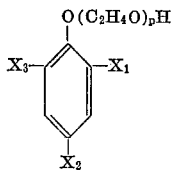
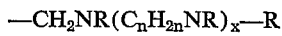

wherein one of the substituents $X_1$, $X_2$, and $X_3$ is an alkyl radical containing from 1 to 3 carbon atoms and the other two substituents conform to the formula $$—CH_2NR(C_nH_{2n}NR)_x—R$$

wherein each R is independently selected from the group consisting of hydrogen, alkyl radicals containing from 1 to 4 carbon atoms and the radical $(C_2H_4O)_pH$, wherein $n$ is an integer from 1 to 3, and $x$ is an integer from 0 to 3 and $p$ may be any number including 0 in any occurrence, such that the ratio of all $p$'s to the number of nitrogen atoms in any molecule does not exceed 30; or the quaternary ammonium derivatives of the compounds characterized by said formula.

---

This is a division of application Ser. No. 488,816 filed Sept. 1, 1965 also abandoned. This invention relates to the regeneration of cellulose from viscose solutions and more particularly to the manufacture of regenerated cellulose articles such as yarn and film from viscose. This invention further relates to novel compositions useful as viscose additives.

It is an object of this invention to provide a process for producing high-tenacity regenerated cellulose yarn having novel and desirable properties.

It is another object of this invention to provide a process for producing high-tenacity regenerated cellulose yarn.

It is another object of this invention to provide a process whereby unripened viscose can be spun to produce a high-tenacity, fatigue-resistant regenerated cellulose fiber having improved soil and abrasion resistance.

It is another object of this invention to provide novel viscose compositions adapted to the spinning of high-tenacity regenerated cellulose yarns.

It is another object of this invention to provide novel compositions useful as viscose additivies.

The foregoing objects and still further objects and advantages of the invention are achieved by providing viscose additive compositions which comprise compounds and quaternary ammonium derivatives of compounds exemplified by the following generalized chemical formula:

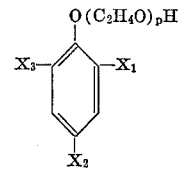

wherein one of the substituents $X_1$, $X_2$ and $X_3$ is an alkyl radical containing from 1 to 3 carbon atoms and the other two substituents conform to the formula $$—CH_2NR(C_nH_{2n}NR)_x—R$$

wherein each R is independently selected from the group consisting of hydrogen alkyl radicals containing from 1 to 4 carbon atoms and the radical $(C_2H_4O)_pH$, wherein $n$ is an integer from 1 to 3, wherein $x$ is an integer from to 3 and wherein $p$ may be any number including 0 in any occurrence such that the ratio of all $p$'s to the number of nitrogen atoms in any molecule does not exceed 30.

A class of novel compounds suitable for use as viscose additive compositions are provided according to the present invention by compounds and the quaternary ammonium derivatives of compounds comprised by the above-mentioned generalized formula wherein one of the substituents $X_1$, $X_2$ and $X_3$ is an alkyl radical containing from 1 to 3 carbon atoms and the other two substituents conform to the formula $—CH_2NR(C_nH_{2n}NR)_x—R$ wherein each R is independently selected from the group consisting of hydrogen, alkyl radicals containing from 1 to 4 carbon atoms and the radical $(C_2H_4O)_pH$, wherein $n$ and $x$ are each integers from 1 to 3 and wherein $p$ may be any number including 0 in any occurrence provided that $p$ is at least 1 in at least one occurrence and that the ratio of all $p$'s to the number of nitrogen atoms in any molecule does not exceed 30.

Broadly, viscose additive compositions suitable for use according to the present invention comprise polyamine condensation products produced by the condensation of an alkyl phenol with formaldehyde and ammonia or a primary or secondary amine or an alkylene polyamine having at least one amino group of primary or secondary character. The term "polyamine condensation product" wherever used hereinafter in this specification will be understood to have the meaning assigned thereto in the preceding sentence.

In addition to said polyamine condensation products, further viscose additive compositions suitable for use according to this invention may be produced by ethoxylation of the aforesaid polyamine condensation products. Still further suitable viscose additive compositions may be provided by the quaternization with a suitable quaternizing agent of the said polyamine condensation products or their ethoxylated derivatives.

Then phenolic compound used to prepare the basic polyamine condensation products of the present invention may be selected from a variety of alkyl phenols, such as orthomethyl phenol, paraethyl phenol, ortho isopropyl phenol and parabutyl phenol. In accordance with the present invention, however, the alkyl group attached to the carbon atom ring of the phenolic compound preferably contains not more than three carbon atoms. In general, although not necessarily in every case, an alkyl group attached to the carbon atom ring of the phenolic compound which contains more than three carbon atoms will tend to render the polyamine condensation product, and its derivatives prepared therefrom, insoluble in viscose solution.

Representative nitrogen-containing compounds which may be used to prepare the aforesaid polyamine condensation products include ammonia; primary or secondary amines, such as dimethyl amine, ethyl amine, isopropyl amine and butyl amine and alkylene polyamines, such as diethylene triamine, N-methyl propylene diamine or a condensation of diethylenetriamine. Other suitable polyamines are dipropylene triamine, ethylene diamine and, in general, polyamines having not more than three carbon atoms in any carbon chain which contain at least one amino group of primary or secondary character and, in addition, one or more amino groups of primary, secondary or tertiary character.

Among the derivatives of the afore-mentioned polyamine condensation products which comprise suitable viscose additive compositions in accordance with the present invention are classes of ethylene oxide adducts of the afore-said condensation products which include (a) preparations with a number of moles of ethylene oxide sufficient to convert completely all the primary and secondary amino groups of the polyamine condensation product to tertiary amine and (b) preparations with a number of moles of ethylene oxide which are sufficient to convert only a part of all the available primary and secondary amino groups of the polyamine condensation product to tertiary amine. In addition, ethoxylation of the phenolic hydroxyl groups may occur. In any case, in accordance with this invention, the polyamine condensation product is preferably ethoxylated to contain not more than about 30 ethylene oxide groups per nitrogen atom in the molecule of the product.

Still other derivatives which comprise suitable viscose additive compositions in accordance with this invention are the quaternary ammonium salts of the afore-mentioned polyamine condensation products and their ethylene oxide adducts. In general, the quaternary ammonium derivatives of said polyamine condensation products and their ethoxylated derivatives may be prepared in conventional manner using suitable quaternizing agents which comprise, for example, alkyl halides, such as methyl chloride, ethyl chloride, methyl bromide and the like; alkyl sulfates, such as dimethyl sulfate and diethyl sulfate; alkyl phosphates, such as dimethyl phosphate and diethyl phosphate; alkyl phosphites, such as methyl phosphite and ethyl phosphite and alkyl nitrates such as methyl nitrate and ethyl nitrate.

The polyamine condensation products of the present invention may be prepared by means of a reaction, the mechanics of which are believed to involve, although not necessarily completely, those of the well-known "Mannich" reaction whereby primary or secondary amino groups, or both, condensed to alkyl phenol with formaldehyde, form a molecule having two or more amine groups of primary, secondary or tertiary character. The condensation is effected by blending the amino nitrogen-containing compound and alkyl phenol to a uniform dispersion, or solution, depending upon the solubility of the reactants. If necessary, the mixture is heated to liquefy the reactants. The formaldehyde is then added at room temperature to the reactants after the amino nitrogen-containing compound has been wetted by the phenolic compound. Heat but no catalyst is required to obtain condensation. The reaction is carried out at room temperature which, however, may rise to as high as 215° C. at the termination of the reaction. Condensation is considered complete when one mol of water is driven off for each mol of reactant formaldehyde.

EXAMPLE 1

To a suitable coverable vessel equipped with an agitator and a condenser cooling system such as a reaction kettle with cover and vent, are added at room temperature 27.2 grams of p-isopropyl phenol followed by 12.0 grams of paraformaldehyde, after which the reactants are mixed to a uniform suspension. The agitator is then shut off and 41.2 grams diethylenetriamine are added to the vessel without further mixing. The vessel is closed, the vent opened and agitator turned on. Prior to adding the amine, the condenser cooling water is turned on. Exothermic reaction of the mixture in the vessel will carry the temperature to about 100° C., after which heat is slowly applied to the vessel. Continue applying heat to the vessel in such manner that the desired temperature of 215° C. is reached after about 2 to 3 hours from the start of the exothermic reaction. Reaction is complete when 215° C. is reached. When the reaction has been completed, the reaction product is cooled below 120° C. and is then ready for use.

EXAMPLE 2

Preparation of $\alpha^2,\alpha^4$-bis(dimethylamino) mesitol 3728 grams (15.8 mols) of dimethylamine (19% solution) and 682 grams (6.32 mols) of o-cresol were placed together in a 12 liter 3-necked flask equipped with stirrer, thermometer and addition funnel. The flask was arranged so that it could be either cooled in ice water or heated with steam.

1300 grams (15.8 mols) of Formalin (36.7% formaldehyde) were added in portions over a one hour period from the funnel with vigorous stirring of the heterogeneous reaction mixture and ice water cooling so as to maintain the slightly exothermic reaction at 20–25° C. The reaction was stirred an additional hour at room temperature and then three hours on the steam bath.

The reaction mixture was poured immediately into a large separatory funnel. A dark organic layer separated while still hot (the product is less soluble in hot water). The water layer was saturated with salt and extracted (when cool) with ether. The organic layer and organic extracts were dried overnight over sodium sulfate, combined and vacuum stripped to 100° C. at 2 mm. pressure. The crude yield of 1344 grams of dark red oil were distilled according to the following schedule:

DISTILLATION

| Time | Pot temp.,° | Read temp.,° | Pres., mm. | Comments |
|---|---|---|---|---|
| 2:50 | 127 | 69 | 1.4 | 1st drop. |
| 3:01 | 134 | 114 | 1.0 | Frac. I=13 grams. |
| 3:26 | 137 | 118 | 1.1 | |
| 5:05 | 140 | 119 | 1.3 | Frac. II=1,199 grams. |
| 5:48 | 152 | 118 | 1.3 | OFF. |
| Pot residue | | | | 132 grams. |
| Total | | | | 1,344 grams. |

NOTE: Fraction II (product) distilled at 118°–119° C. at 1.1–1.3 mm.

The pot residue was stripped of all volatiles to give 53 grams of additional distillate. This was redistilled to yield 36 grams of additional product.

Total yield: 1199+36=1235 grams (33% of theory) pale yellow liquid.

EXAMPLE 3

Preparation of $\alpha^2,\alpha^4$-bis{[N-(N'-2-aminoethyl 2-aminoethyl]amino}mesitol 648 grams (6.08 mols) of o-cresol and 1254 grams (12–16 mols) of diethylenetriamine were mixed in a 3-necked, 3-liter round-bottomed flask equipped with stirrer, thermometer and powder funnel. The flask was so arranged that it could be cooled in an ice bath or heated with a mantle. 365 grams of paraformaldehyde were added in successive increments through the powder funnel into the stirred mixture of the other reactants. The exothermic reaction was held at 40° C. to 50° C. by partial cooling with an ice bath. When the paraformaldehyde had all been added, the reaction mixture was stirred with cooling until the temperature dropped to 40° C. The ice bath was removed and the reaction mixture stirred an additional 30 minutes as the temperature dropped to 35° C. and the last of the formaldehyde dissolved and reacted. The reaction product was allowed to stand overnight.

The powder funnel was replaced with an 8-inch insulated Vigreux column and the reaction product was now heated to distill out the water of reaction according to the following schedule:

| Time | Pot temp.,° | Head temp.,° | H₂O distilled (cumulative) |
| --- | --- | --- | --- |
| 3:25 | 115 | 28 | 1st drop. |
| 3:35 | 123 | 104 | 30 cc. |
| 4:08 | 134 | 108 | 130 cc. |
| 4:47 | 157 | 120 | 213 cc. |
| 4:59 | 165 | 119 | 225 cc. (= theory) OFF. |

In general, in the preparation of the types of ethylene oxide adducts of the condensation products of alkyl phenols, formaldehyde and ammonia or amino nitrogen-containing compounds hereinbefore mentioned, from as little as about one to as high as about two hundred forty mols of alkylene oxide may be added to each mol of polyamine condensation product in accordance with the present invention, by replacement of one or more of the active hydrogen atoms thereof. The ethylene oxide adducts of the polyamine condensation products may be prepared in an autoclave using a suitable catalyst such as sodium hydroxide or sodium methylated. Before addition of the ethylene oxide, the autoclave is purged free of oxygen contamination with nitrogen or natural gas and is then heated to a temperature within the range of about 100° C. to 150° C. Addition of the ethylene oxide to the polyamine condensation product is started at about 30 p.s.i.g. inert gas pressure in the autoclave and at a temperature within a range of about 100° C. to 160° C. Generally, 30 to 100 p.s.i.g. pressure is reported during ethylene oxide addition and the addition required from about one to about ten hours reaction time.

The following is a specific example of the preparation of an alkylene oxide addition product of the polyamine condensation products of the present invention:

EXAMPLE 4

3.66 pounds of the polyamine condensation product of Example 1 and 9.0 grams of sodium hydroxide catalyst are charged to an autoclave using standard methods therefore and then moisture is bled from the reactor at a temperature of about 230° F. Ethylene oxide in an amount of 4.40 pounds is added to the reactor at a temperature within the range of about 230° F. to 240° F. and at a 10% ethylene oxide rate of flow. The reaction is not and precaution most be taken to prevent excessive temperatore and pressure. Feeding of the ethylene oxide at the 10% flow rate is continued until a steady temperature and pressure have been attained. It should be noted that at this stage of the reaction, a temperature of about 300° F. and/or a pressure of about 60 p.s.i.g. should not be exceeded. After the temperature and pressure of the reaction have been brought under control, the flow rate of the ethylene oxide is increased to about 20% and thereafter gradually increased again to about 50%, providing temperature and pressure are controllable during such increase.

EXAMPLE 5

Preparation of polyoxyethylene(20) $\alpha^2,\alpha^4$ (dimethylamino) mesitol 1009 grams of the polyamine condensation product of Example 2 and 10 grams of sodium hydroxide (powdered) are loaded into an autoclave previously purged with nitrogen. The autoclave is evacuated to 65 mm. Hg absolute or less and thereafter the vacuum is broken with ethylene oxide. The loaded ingredients are heated to 140° C. and ethylene oxide is introduced under pressure maintained between 30–50 p.s.i.g. When ethylene oxide in a total amount of 3991 grams has been added, the mixture is allowed to react to zero p.s.i.g. or to a constant pressure for 30 minutes. The reaction mixture is cooled to 120° C. and deodorized for 15 minutes at less than 100 mm. Hg absolute. Thereafter, the product is cooled to 60° C. and drained.

EXAMPLE 6

Preparation of polyoxyethylene(20) $\alpha^2,\alpha^4$ bis{[N-(N-2-aminoethyl) 2-aminoethyl]amino}mesitol 1521 grams of the polyamine condensation product of Example 3 are loaded into an autoclave previously purged with nitrogen. The autoclave is evacuated to 65 mm. Hg. absolute or less and the vacuum is subsequently broken with nitrogen. 5 grams of concentrated HCl are added and the mixture heated to 120° C. Thereafter, ethylene oxide in the amount of 3479 grams is added at a rate sufficient to maintain the reaction at a temperature between 120° C. and 140° C. and at a pressure between 20–50 p.s.i.g. When the reaction stops, the charge is cooled down and 12 grams of NaOH (powdered) are added. The reaction is then allowed to go to completion as indicated by a pressure of zero p.s.i.g. or constant pressure for 30 minutes. The product is deodorized in an autoclave at 120° C. and at less than 100 mm. Hg absolute for 15 minutes. Thereafter, the product is cooled to 60° C. and drained.

EXAMPLE 7

Preparation of methyl chloride quaternary ammonium salt of $\alpha^2,\alpha^4$, bis (dimethylamino) mesitol 2630 grams of the polyamine condensation product of Example 2 are introduced into an autoclave previously purged with nitrogen. The autoclave is evacuated to 65 mm. Hg absolute or less and the vacuum broken with methyl chloride. The temperature is raised to 80° C. and methyl chloride is added to a total of 2370 grams. When all of the methyl chloride has been added, the temperature is raised to within a range from 90° C. to 100° C. and the pressure is maintained within 50–60 p.s.i.g. The mixture is allowed to react to zero p.s.i.g. or to constant pressure for 30 minutes. Thereafter, vacuum is applied and the product deodorized at 90° to 100° C. and less than 100 mm. Hg absolute for 15 minutes. The product is cooled to 60° C. and drained.

EXAMPLE 8

Preparation of methyl chloride quaternary ammonium salt of polyoxyethylene (20) $\alpha^2,\alpha^4$ bis (dimethylamine) mesitol 4232 grams of the ethoxylated condensation product of Example 5 are introduced into an autoclave previously purged with nitrogen. The autoclave is evacuated into 65 mm. Hg absolute or less and the vacuum subsequently broken with methyl chloride. The temperature is raised to 80° C. and methyl chloride is added in an amount of 768 grams total. After all of the methyl chloride has been introduced into the autoclave, the temperature is raised from 90° C. to 100° C. and the pressure is maintained within 50–60 p.s.i.g. The mixture is allowed to react to zero p.s.i.g. or a constant pressure for 30 minutes. Thereafter, vacuum is applied and the product deodorized at 90° C. to 100° C. and at less than 100 mm. Hg absolute for 15 minutes. The product is then cooled to 90° C. and drained.

EXAMPLE 9

Preparation of methyl chloride quaternary ammonium salt of polyoxyethylene (20) $\alpha^2,\alpha^4$-bis {[N-(N'-2-aminoethyl) 2-amino-ethyl] amino} mesitol 3800 grams upon the ethoxylated polyamine condensation product of Example 6 are introduced into the autoclave previously purged with nitrogen. The autoclave is evacuated to 65 mm. Hg absolute or less and the vacuum subsequently broken with methyl chloride. The temperature is raised to 80° C. and methyl chloride is added in an amount of 1200 grams total. After all of the methyl chloride has been introduced into the autoclave, the temperature is raised from 90° C. to 100° C. and mixture allowed to react to zero p.s.i.g. or constant pressure for 30 minutes. Thereafter, vacuum is applied and the product is deodorized in the autoclave at a temperature within the range of 90° C. to 100° C. and less than 100 mm. Hg absolute for 15 minutes. The product is then cooled to 60° C. and drained.

EXAMPLE 10

338 grams of the polyamine condensation product of Example 3 are introduced into an autoclave previously purged with nitrogen. The autoclave is evacuated to 65 mm. Hg absolute or less and the vacuum is broken with methyl chloride. The temperature is raised to 80° C. and methyl chloride is added in an amount of 404 grams. When all of the methyl chloride has been added, the temperature is raised to within a range from 90° C. to 100° C. while the pressure is maintained within 50–60 p.s.i.g. The mixture is allowed to react to 0 p.s.i.g. or constant pressure for 30 minutes. The reaction mixture is then neutralized with caustic soda. Thereafter, the autoclave is then again evacuated to 65 mm. Hg absolute or less and the vacuum broken with methyl chloride. The temperature is raised to 80° C. and an additional quantity of methyl chloride in an amount of 50.5 grams is added. When the methyl chloride has been added the temperature is raised to within a range from 90° C. to 100° C. and the pressure is maintained within 50–60 p.s.i.g. The mixture is allowed to react to 0 p.s.i.g. or to constant pressure for 30 minutes. Thereafter, vacuum is applied and the product deodorized at 90° C. to 100° C. and less than 100 mm. Hg absolute for 15 minutes. The product is cooled to 60° C. and drained.

Novel viscose compositions are provided in accordance with the present invention by incorporating into viscose solution a compound selected from the group consisting of the aforesaid polyamine condensation products, their ethylene oxide adducts and quaternary ammonium derivatives of both of these. The said compounds are soluble in viscose solutions and may be incorporated thereinto at any stage of the viscose process after the cellulose is dissolved. For effective results, from about 0.5% to about 6.0% by weight of the additive compound based on the weight of cellulose in the solution is employed. The composition of the viscose may vary widely and is known in the art. It may be formed from cotton linters or from wood pulp as the source of cellulose, and may contain from about 4% to about 10% of cellulose in a solution containing from about 4.0% to about 8.0% of alkali metal hydroxide. The amount of carbon disulfide used in zanthation may be from about 25.0% to about 50.0%.

The viscose solutions of the invention, i.e., those containing the hereinbefore defined additive compounds, may be employed in the normal manner for the production of regenerated cellulose films and yarns. Suitable spinning or regenerating baths containing sulfuric acid, zinc sulfate and sodium sulfate. Preferred spinning baths contain from 4.0% to 12.0% sulfuric acid, from 1.0% to 10.0% zinc sulfate and from 13.0% to 25.0% sodium sulfate.

The following examples illustrate the preparation of viscose solutions and production of regenerated cellulose yarn therefrom, both in accordance with the invention.

EXAMPLE 11

A cotton linter's viscose containing 7.0% cellulose and 6.6% sodium hydroxide is prepared in conventional manner except that during the dissolution of the zanthated cellulose in aqueous sodium hydroxide, 1% by weight of the polyamine condensation product of Example 1 is added and thoroughly dispersed therein. The resultant viscose solution is spun in an unripened state (high salt index of 7) into a bath of 7% sulfuric acid, 8% zinc sulfate and 20% sodium sulfate. The spinning and processing is carried out on conventional equipment to produce regenerated cellulosic yarn of high tensile strength resistant to flexing and to abrasion of especial benefit as a tire yarn.

EXAMPLE 12

A viscose containing 6.6% cellulose and 6% sodium hydroxide is modified by the addition of 1.4% of the ethylene oxide adduct of Example 1. The modified viscose solution is spun on conventional equipment into a bath of 8% sulfuric acid, 8% zinc sulfate and 20% sodium sulfate. Yarns of smooth surface and high tensile strength resistant to soiling result.

Although this invention has been described with reference to specific reactant materials, including specific amino nitrogen containing compounds, phenolic compounds, ethylene oxide adducts and quaternary ammonium derivatives, as well as viscose compositions containing specific polyamine condensation adducts, ethylene oxide adducts and quaternary ammonium derivatives, it will be apparent that still other different and equivalent materials may be substituted for those described, that different and equivalent method steps may be employed and, indeed, in some cases reversed or substituted for other steps, all within the spirit and scope of this invention as defined in the appended claims.

Having thus described my invention, I claim:

1. Viscose containing from about 0.5% to about 6.0% based on the cellulose content of the viscose of a compound represented by the chemical formula:

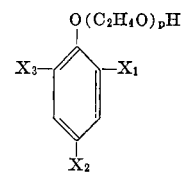

wherein one of the substituents $X_1$, $X_2$ and $X_3$ is an alkyl radical containing from 1 to 3 carbon atoms and the other two substituents conform to the formula

wherein each R is independently selected from the group consisting of hydrogen, alkyl radicals containing from 1 to 4 carbon atoms and the radical $(C_2H_4O)_pH$, wherein $n$ is an integer from 1 to 3, wherein $x$ is an integer from 0 to 3 and wherein $p$ may be any number including 0 in any occurrence such that the ratio of all $p$'s to the number of nitrogen atoms in any molecule does not exceed 30 or of quaternary ammonium derivatives of compounds characterized by said formula.

2. A viscose composition according to claim 1 wherein said compound is a condensation product of orthomethyl phenol, formaldehyde and an amine selected from the group consisting of diethylenetriamine and dimethylamine.

3. A viscose composition according to claim 1 wherein said compound is an ethylene oxide adduct of the condensation product of orthomethyl phenol, formaldehyde and diethylene triamine, said adduct containing about 20 ethylene oxide groups per molecule.

4. A viscose composition according to claim 1 wherein said compound is a quaternary ammonium derivative of methyl chloride.

5. A viscose composition according to claim 1 wherein said compound is a quaternary ammonium derivative of a condensation product of orthomethyl phenol, formaldehyde and an amine selected from the group consisting of diethylenetriamine and dimethylamine.

6. A viscose composition according to claim 1 wherein said compound is a quaternary ammonium derivative an ethylene oxide adduct, containing about 20 ethylene oxide groups per molecule, of the condensation product of orthomethyl phenol, formaldehyde and diethylene triamine.

7. A viscose composition according to claim 1 wherein said composition contains from about 4 to about 10 percent cellulose and from about 4 to about 8 percent alkali metal hydroxide based upon the weight of the viscose composition.

8. A method of producing regenerated cellulosic structures which comprises spinning into an acid regenerating bath a viscose composition according to claim 1.

9. A method of producing regenerated cellulosic structure which comprises spinning into an acid regenerating bath a viscose composition according to claim 2.

10. A method of producing regenerated cellulosic structures which comprises spinning into an acid regenerating bath a viscose composition according to claim 3.

11. A method of producing regenerated cellulosic structures which comprises spinning into an acid regenerating bath a viscose composition according to claim 4.

12. A method of producing regenerated cellulosic structures which comprises spinning into an acid regenerating bath a viscose composition according to claim 5.

13. A method of producing regenerated cellulosic structures which comprises spinning into an acid regenerating bath a viscose composition according to claim 6.

14. A method of producing regenerated cellulosic structures which comprises spinning into an acid regenerating bath a viscose composition according to claim 7.

References Cited
UNITED STATES PATENTS

| | | | |
|---|---|---|---|
| 3,280,097 | 10/1966 | Cizek | 260—102 |
| 2,998,452 | 8/1961 | Bruson et al. | 260—570.9 |
| 2,451,558 | 10/1948 | Schlosser et al. | 264—188 |
| 2,260,967 | 10/1941 | Bruson | 260—404 |

MORRIS LIEBMAN, Primary Examiner

T. MORRIS, Assistant Examiner

U.S. Cl. X.R.

106—186, 188